US008029360B2

(12) United States Patent
Lind et al.

(10) Patent No.: US 8,029,360 B2

(45) Date of Patent: Oct. 4, 2011

(54) DYNAMICALLY CONFIGURABLE GAMING SYSTEM

(75) Inventors: Clifton E. Lind, Austin, TX (US); Jefferson C. Lind, Austin, TX (US); Brendan M. O'Connor, Austin, TX (US); Gary L. Loebig, Austin, TX (US); Robert F. Lannert, Broken Arrow, OK (US); Joseph R. Enzminger, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 1420 days.

(21) Appl. No.: 10/643,189

(22) Filed: Aug. 18, 2003

(65) Prior Publication Data

US 2004/0229698 A1 Nov. 18, 2004

Related U.S. Application Data

(63) Continuation-in-part of application No. 10/624,279, filed on Jul. 22, 2003.

(60) Provisional application No. 60/470,081, filed on May 13, 2003.

(51) Int. Cl.
*A63F 9/24* (2006.01)
*G06F 19/00* (2011.01)

(52) U.S. Cl. ............................... 463/29; 463/40; 463/42

(58) Field of Classification Search ................ 463/1, 16, 463/29–37, 40–43, 46, 47, 25
See application file for complete search history.

(56) References Cited

U.S. PATENT DOCUMENTS 4,198,052 A 4/1980 Gauselmann
4,335,809 A * 6/1982 Wain .............................. 463/20
4,516,777 A 5/1985 Nikora
4,593,376 A 6/1986 Volk
4,596,390 A 6/1986 Studley
4,611,808 A * 9/1986 Palmer ............................ 463/25
4,722,527 A 2/1988 Gauselmann
4,775,937 A * 10/1988 Bell ............................... 463/28
4,856,787 A * 8/1989 Itkis .............................. 273/237
4,922,420 A 5/1990 Nakagawa et al.
4,964,638 A * 10/1990 Ishida ............................. 463/27
5,042,809 A 8/1991 Richardson
5,114,157 A 5/1992 Kita
5,242,163 A * 9/1993 Fulton ............................. 463/13

(Continued)

FOREIGN PATENT DOCUMENTS

GB 1542284 * 3/1979

(Continued)

*Primary Examiner* — Peter DungBa Vo

*Assistant Examiner* — Bach Hoang

(74) *Attorney, Agent, or Firm* — Russell D. Culbertson; The Culbertson Group, P.C.

(57) ABSTRACT

A gaming system (40) according to the present invention includes a number of gaming machines (10), each gaming machine including a single player game presentation arrangement that may be reconfigured to provide any one of a number of game presentations. In addition to the gaming machines (10) the present gaming system (40) includes a system configuration arrangement (51) and a game modification controller (50). The system configuration arrangement (51) produces system configuration commands based either on manual inputs, system usage information, or various information related to one or more players in a gaming facility. The game modification controller (50) included in preferred forms of the gaming system receives the system configuration commands and in response to the commands, communicates presentation switching instructions to one or more gaming machines (10) included in the system.

5 Claims, 6 Drawing Sheets

U.S. PATENT DOCUMENTS

| | | | | | |
|---|---|---|---|---|---|
| 5,249,800 | A * | 10/1993 | Hilgendorf et al. | 463/27 |
| 5,259,613 | A * | 11/1993 | Marnell, II | 463/42 |
| 5,342,047 | A * | 8/1994 | Heidel et al. | 463/29 |
| 5,342,049 | A | 8/1994 | Wichinsky et al. | |
| 5,413,357 | A | 5/1995 | Schulze et al. | |
| 5,468,001 | A | 11/1995 | Hermo | |
| 5,643,086 | A | 7/1997 | Alcorn et al. | |
| 5,702,302 | A | 12/1997 | Gauselmann | |
| 5,704,835 | A | 1/1998 | Dietz, II | |
| 5,725,428 | A | 3/1998 | Achmüller | |
| 5,740,897 | A | 4/1998 | Gauselmann | |
| 5,770,533 | A | 6/1998 | Franchi | |
| 5,785,595 | A | 7/1998 | Gauselmann | |
| 5,802,544 | A | 9/1998 | Combs et al. | |
| 5,833,538 | A * | 11/1998 | Weiss | 463/21 |
| 5,882,262 | A | 3/1999 | Ballhorn | |
| 5,923,252 | A * | 7/1999 | Sizer et al. | 340/573.1 |
| 5,951,397 | A | 9/1999 | Dickinson | |
| 5,997,400 | A | 12/1999 | Seelig et al. | |
| 6,089,980 | A | 7/2000 | Gauselmann | |
| 6,106,396 | A | 8/2000 | Alcorn et al. | |
| 6,110,041 | A * | 8/2000 | Walker et al. | 463/20 |
| 6,126,541 | A | 10/2000 | Fuchs | |
| 6,126,542 | A | 10/2000 | Fier | |
| 6,135,884 | A * | 10/2000 | Hedrick et al. | 463/20 |
| 6,142,873 | A | 11/2000 | Weiss et al. | |
| 6,149,522 | A | 11/2000 | Alcorn et al. | |
| 6,154,139 | A * | 11/2000 | Heller | 340/573.4 |
| 6,254,481 | B1 * | 7/2001 | Jaffe | 463/20 |
| 6,287,202 | B1 * | 9/2001 | Pascal et al. | 463/42 |
| 6,293,866 | B1 * | 9/2001 | Walker et al. | 463/20 |
| 6,312,334 | B1 * | 11/2001 | Yoseloff | 463/25 |
| 6,315,664 | B1 | 11/2001 | Baerlocher et al. | |
| 6,350,199 | B1 * | 2/2002 | Williams et al. | 463/16 |
| 6,354,943 | B1 | 3/2002 | Miura | |
| 6,361,437 | B1 * | 3/2002 | Walker et al. | 463/23 |
| 6,368,216 | B1 | 4/2002 | Hedrick et al. | |
| 6,409,602 | B1 * | 6/2002 | Wiltshire et al. | 463/42 |
| 6,491,583 | B1 | 12/2002 | Gauselmann | |
| 6,517,437 | B1 * | 2/2003 | Wells et al. | 463/30 |
| 6,524,184 | B1 * | 2/2003 | Lind et al. | 463/13 |
| 6,605,003 | B2 | 8/2003 | Suchocki et al. | |
| 6,620,047 | B1 * | 9/2003 | Alcorn et al. | 463/37 |
| 6,634,942 | B2 | 10/2003 | Walker et al. | |
| 6,641,484 | B2 * | 11/2003 | Oles et al. | 463/47 |
| 6,645,068 | B1 | 11/2003 | Kelly et al. | |
| 6,645,078 | B1 * | 11/2003 | Mattice | 463/42 |
| 6,646,695 | B1 | 11/2003 | Gauselmann | |
| 6,656,048 | B2 * | 12/2003 | Olsen | 463/25 |
| 6,659,866 | B2 * | 12/2003 | Frost et al. | 463/17 |
| 6,669,566 | B2 | 12/2003 | Iijima et al. | |
| 6,676,513 | B2 | 1/2004 | Gauselmann | |
| 6,712,698 | B2 * | 3/2004 | Paulsen et al. | |
| 6,749,510 | B2 | 6/2004 | Giobbi | |
| 6,786,824 | B2 * | 9/2004 | Cannon | 463/42 |
| 6,800,030 | B2 * | 10/2004 | Acres | 463/25 |
| 6,896,616 | B2 | 5/2005 | Weiss | |
| 6,902,484 | B2 | 6/2005 | Idaka | |
| RE38,812 | E | 10/2005 | Acres et al. | |
| 6,960,136 | B2 | 11/2005 | Joshi et al. | |
| 7,198,571 | B2 * | 4/2007 | LeMay et al. | 463/25 |
| 7,316,619 | B2 * | 1/2008 | Nelson | 463/42 |
| 7,326,116 | B2 * | 2/2008 | O'Donovan et al. | 463/29 |
| 7,390,264 | B2 * | 6/2008 | Walker et al. | 463/42 |
| 2001/0044337 | A1 * | 11/2001 | Rowe et al. | 463/29 |
| 2002/0002078 | A1 | 1/2002 | Jaffe | |
| 2002/0065132 | A1 | 5/2002 | Stephan | |
| 2002/0107075 | A1 | 8/2002 | Stephan | |
| 2002/0137217 | A1 * | 9/2002 | Rowe | 436/42 |
| 2003/0001338 | A1 | 1/2003 | Bennett et al. | |
| 2003/0013511 | A1 | 1/2003 | Suzuki | |
| 2003/0017865 | A1 | 1/2003 | Beaulieu et al. | |
| 2003/0064771 | A1 | 4/2003 | Morrow et al. | |
| 2003/0130039 | A1 * | 7/2003 | Nelson | 463/42 |
| 2003/0148809 | A1 * | 8/2003 | Nelson | 463/29 |
| 2003/0166417 | A1 | 9/2003 | Moriyama et al. | |
| 2003/0216167 | A1 * | 11/2003 | Gauselmann | 463/25 |
| 2003/0216182 | A1 | 11/2003 | Gauselmann | |
| 2004/0002379 | A1 | 1/2004 | Parrott et al. | |
| 2004/0048657 | A1 | 3/2004 | Gauselmann | |
| 2004/0110566 | A1 | 6/2004 | Schneider | |
| 2004/0142737 | A1 * | 7/2004 | Gauselmann | 463/16 |
| 2004/0166940 | A1 * | 8/2004 | Rothschild | 463/42 |
| 2004/0209692 | A1 * | 10/2004 | Schober et al. | 463/42 |
| 2004/0224753 | A1 | 11/2004 | O'Donovan et al. | |
| 2005/0009600 | A1 * | 1/2005 | Rowe et al. | 463/29 |
| 2005/0096121 | A1 | 5/2005 | Gilliland et al. | |
| 2005/0239545 | A1 * | 10/2005 | Rowe | 463/29 |
| 2005/0255919 | A1 * | 11/2005 | Nelson | 463/40 |
| 2007/0087834 | A1 * | 4/2007 | Moser et al. | 463/42 |
| 2007/0099697 | A1 * | 5/2007 | Nelson | 463/29 |
| 2007/0167229 | A1 * | 7/2007 | LeMay et al. | 463/29 |

FOREIGN PATENT DOCUMENTS

| | | | |
|---|---|---|---|
| GB | 1545301 | * | 5/1979 |

* cited by examiner

DYNAMICALLY CONFIGURABLE GAMING SYSTEM

CROSS-REFERENCE TO RELATED APPLICATIONS

This application is related to U.S. provisional patent application No. 60/470,081, filed May 13, 2003, entitled "MULTIPLE VIDEO DISPLAY GAMING MACHINE AND GAMING SYSTEM," the entire content of which is hereby incorporated herein by this reference. The Applicants hereby claim the benefit of this earlier pending provisional application under 35 U.S.C. §119(e). This application is also a continuation-in-part of U.S. non-provisional patent application Ser. No. 10/624,279 filed Jul. 22, 2003, entitled "MULTIPLE VIDEO DISPLAY GAMING MACHINE AND GAMING SYSTEM" and published at U.S. Patent Publication No. 2004-022693-A1, the entire content of which is hereby incorporated herein by this reference. The Applicants hereby claim the benefit of this earlier pending non-provisional application under 35 U.S.C. §120.

TECHNICAL FIELD OF THE INVENTION

The present invention relates to gaming machines that may be readily modified to change the game presentation provided by the gaming machine. In particular, the invention relates to systems of such gaming machines that configure the various gaming machines to provide different game presentations based upon various conditions.

BACKGROUND OF THE INVENTION

A number of different games of chance may use electronic gaming machines as an interface through which players may participate in the game. For example, electronic gaming machines may be used to imitate a traditional mechanical slot machine, a poker game, blackjack game, or other traditional casino games. Electronic gaming machines may also be used to play lottery games, bingo and games similar to bingo, and other games of chance that are not necessarily related to any traditional casino game.

Electronic gaming machines are commonly housed in a large and oftentimes standalone cabinet. The cabinet includes a front side on which is mounted a game video display along with player controls. Player controls may include various types of mechanical controls such as switches, buttons, and levers mounted on a forwardly extending ledge below the game video display. Player controls may also be incorporated into the game video display itself using touch screen technology. In addition to the game video display and basic player controls through which the player makes choices or takes action in the game offered through the gaming machine, the gaming machines may also include other player interface devices such as coin or paper currency acceptors, player card or credit card acceptors, keypads, and other player interface devices. As with traditional mechanical gaming machines, electronic gaming machines also commonly include a number of static graphic displays. In electronic gaming machines, these static graphic displays are mounted above the game video display and/or below the game video display on the front side of the cabinet. These static graphic displays generally provide information regarding the game offered through the gaming machine such as pay tables and other game related information, and include colorful and attractive graphics that are coordinated with the video display shown on the game video display in the course of game play. The static graphic displays may also incorporate non-static elements such as counters or numeric displays for showing bonus or progressive play information. Video displays may also be incorporated into the static graphic displays to show game related information or information unrelated to the game available at the gaming machine. The graphic display located above the game video display is commonly referred to as the top glass, whereas the graphic display located below the game video display is commonly referred to as the belly glass.

The look of a particular game to a player at an electronic gaming machine may be referred to as the game presentation. This game presentation includes the animated graphics displayed on the game video display and associated static graphics shown on the top glass and belly glass. For example, a gaming machine providing a game presentation imitating a mechanical slot machine will include graphics displayed on the game video display to imitate a number of reels. In response to a player control, these representations of reels are set in motion using suitable graphics display techniques and are made to appear to stop at some final stop position that indicates the outcome of the play. The top glass and belly glass will commonly have graphics associated with a theme of the imitated slot-type game, and a payout table showing payouts for various reel stop positions. As another example, a gaming machine providing a game presentation imitating a poker game may include animated graphics displayed on the game video display showing a card deal and allowing the player to see the cards they are dealt and perhaps certain cards dealt to the house or other players depending upon the specific type of poker game being portrayed. The top and belly glass graphics which are part of the poker presentation will be related to the poker theme and may also include payout tables for the poker game, game rules, and other information.

The game presentation of an electronic gaming machine may depict the actual game offered through the gaming machine or some other game of chance. An example of an electronic gaming machine that depicts the actual game being played is a slot machine type game in which the gaming machine itself or some associated piece of equipment executes a program to independently pick the reel stop positions for a given play, and thus determine the outcome of the play. The component that determines the outcome of a play in these types of gaming machines, including the program, logic, or rules that the component follows, will be considered part of the game presentation for purposes of the present invention along with the pay tables that correlate payouts with the various outcomes or results of play in the game, and along with various graphics and audio that may be sensed by the player when playing at a gaming machine. A video lottery terminal is an example of an electronic gaming machine that may depict a game different from the game actually being played to determine a win/loss result. In video lottery terminals, the win/loss result is determined by a predetermined video lottery ticket or data record that is selected from a set of such records in response to a game play request. The game video display of a video lottery terminal may simply show a representation of the predetermined lottery record selected for a given game play request. However, the graphics provided on the game video display may alternatively provide a presentation of a different game such as a presentation including spinning reels imitating a traditional mechanical slot machine. The reel stop position is dictated by the result associated with the predetermined video lottery record selected in response to a game play request at the video lottery terminal.

A given gaming facility that employs electronic gaming machines may include numerous machines to accommodate a large number of players. Each of the gaming machines is generally dedicated to a particular presentation or perhaps a number of related presentations. Although the underlying hardware included in the gaming machine may be fairly generic from one game presentation to the next, the overall game presentation provided by the gaming machine may be switched only by replacing the top glass and belly glass and perhaps by changing the player controls to accommodate the new game presentation. Thus, changing the game presentation provided by an electronic machine to an entirely different presentation is a substantial undertaking and may be accomplished only by taking the gaming machine out of service for a relatively long period of time. A switch of game presentations commonly requires removing the gaming machine from the casino floor for the changeover. That is, if a casino desires to change from a gaming machine having one presentation to a gaming machine having another presentation, essentially the entire gaming machine must be replaced or at least taken out of service for a substantial period of time to change the static graphic displays. Because switching game presentations in a gaming machine is so involved, the game presentations offered in a given gaming facility are fairly static. It is noted that even in prior art gaming machines that allow the player to choose from among several different games, portions of the game presentation remains static between the different games available at the gaming machine.

Gaming machines having static graphic displays associated with one or more presentations offered by or through the gaming machine are also seriously limited in how they may be deployed. As mentioned above, prior art gaming machines are commonly located in large gaming facilities have many gaming machines. The large number of gaming machines is required not only to accommodate a large number of players but also to ensure a wide variety of game presentations are available in the hope that each player who desires to play will be able to find the particular game presentation they desire. However, a small gaming facility may simply not have the room to provide a wide variety of game presentations and at the same time ensure that the most popular game presentations are also available to players at the facility. Furthermore, it has not been practical to place gaming machines in locations such as hotel rooms because if the persons who happen to be assigned to the room do not desire to play the game having that particular presentation, the gaming machine will have little chance of being used while those persons are assigned to the room. For this reason, placing prior art gaming machines in places such as hotel rooms has not been cost effective.

SUMMARY OF THE INVENTION

The present invention includes a gaming system having a number of individual gaming machines and the ability to dynamically reconfigure one or more of the gaming machines to provide different presentations based on various conditions. The invention also encompasses a method for dynamically reconfiguring one or more gaming machines based on various conditions.

A gaming system according to the present invention includes a number of gaming machines, each gaming machine including a single player game presentation arrangement that may be reconfigured to provide any one of a number of game presentations. In addition to the gaming machines the present gaming system includes a system configuration arrangement and preferably a game modification controller. The system configuration arrangement produces system configuration commands based either on manual inputs by system management personnel or players, system usage information, or various information related to one or more players in a gaming facility. The game modification controller included in preferred forms of the gaming system receives the system configuration commands and responds to the commands by generating appropriate presentation switching instructions and communicating those instructions to one or more gaming machines included in the system.

A system configuration arrangement embodying the principles of the invention may encompass a large variety of monitoring arrangements or systems in addition to a manual configuration interface. Preferred forms of the invention may include one or more of a system usage monitoring controller, a player location tracking controller, a player preference tracking controller, and a player interface controller. These devices participate in monitoring or analyzing gaming machine usage, player location, player or player group characteristics, and interactive player inputs, respectively, and producing system configuration commands based on this monitoring or analysis. The execution of these system configuration commands dynamically configures one or more gaming machines, that is, configures one or more gaming machines in response to actual or presumed conditions at the gaming facility or actual or presumed conditions associated with one or more players at the gaming facility. This dynamic configuration of the gaming machines may optimize the gaming system to enhance each player's experience with the gaming system and generally increase gaming machine usage.

The present invention encompasses the gaming system itself and the methods performed by the gaming system. Because the present gaming system is preferably implemented in data processing hardware that operates under the control of operational program code, the invention also encompasses program products for causing the various hardware elements to perform the desired functions. In particular, a program product according to the present invention includes system configuration program code for producing the system configuration commands. The program product also includes presentation switching program code that responds to the system configuration commands to switch game presentations at one or more gaming machines from one presentation to another.

A gaming machine that may be used in the present invention may include a cabinet having a game video display mounted on a front side of the cabinet. The gaming machine may also include at least one more additional video displays mounted on the front side of the cabinet either above or below the game video display. A player control device is also mounted on the front side of the cabinet. This player control device may be separate from the video displays or may be integrated with one or more of the video displays in the form of a touch screen portion of one or more of the video displays. In one preferred form of the invention the player control device includes a player control touch screen display that forms a portion of a forwardly projecting ledge located below the game video display.

In addition to the player control device, a gaming machine according to the present invention may also include one or more player interface devices such as a player card reader, currency acceptor/validator, or coin acceptor, mounted on the cabinet. These player interface devices may be mounted on the front side of the cabinet on the forwardly projecting ledge or elsewhere.

The additional video displays mounted above and/or below the game video display may be used to display the portion of a game presentation previously displayed by the static displays used in prior art gaming devices. For example, a first additional video display mounted above the game video display may extend across the entire front surface of an upper portion of the gaming device, making up the entire area used for the top glass in prior art gaming machines. Such a video display may be used to display the information and graphics previously displayed by the top glass found in a prior art gaming machine. A second additional video display mounted below the game video display may extend across the entire width of a lower portion of the gaming device, making up the entire area used for the belly glass in prior art gaming machines. Such a second additional video display may be used to display the information and graphics previously displayed by the belly glass of a prior art gaming machine. Using additional video displays rather than static displays provides two important advantages. First, the additional video displays facilitate animated and more interesting graphics and also allow much more information to be displayed. This greatly increases the flexibility of the gaming machine and allows the gaming machine to provide more interesting presentations. The second major advantage associated with employing additional video displays is that the additional video displays allow the entire game presentation of a particular gaming machine to be modified without modifying the static structure of the gaming machine itself. That is, rather than taking a gaming machine out of service to change out the top and belly glass, and perhaps other static graphics on the gaming machine cabinet, the additional video displays of the present invention may simply be provided with different instructions to display a different presentation.

These and other advantages and features of the invention will be apparent from the following description of the preferred embodiments, considered along with the accompanying drawings.

DESCRIPTION OF PREFERRED EMBODIMENTS

Figure 1:
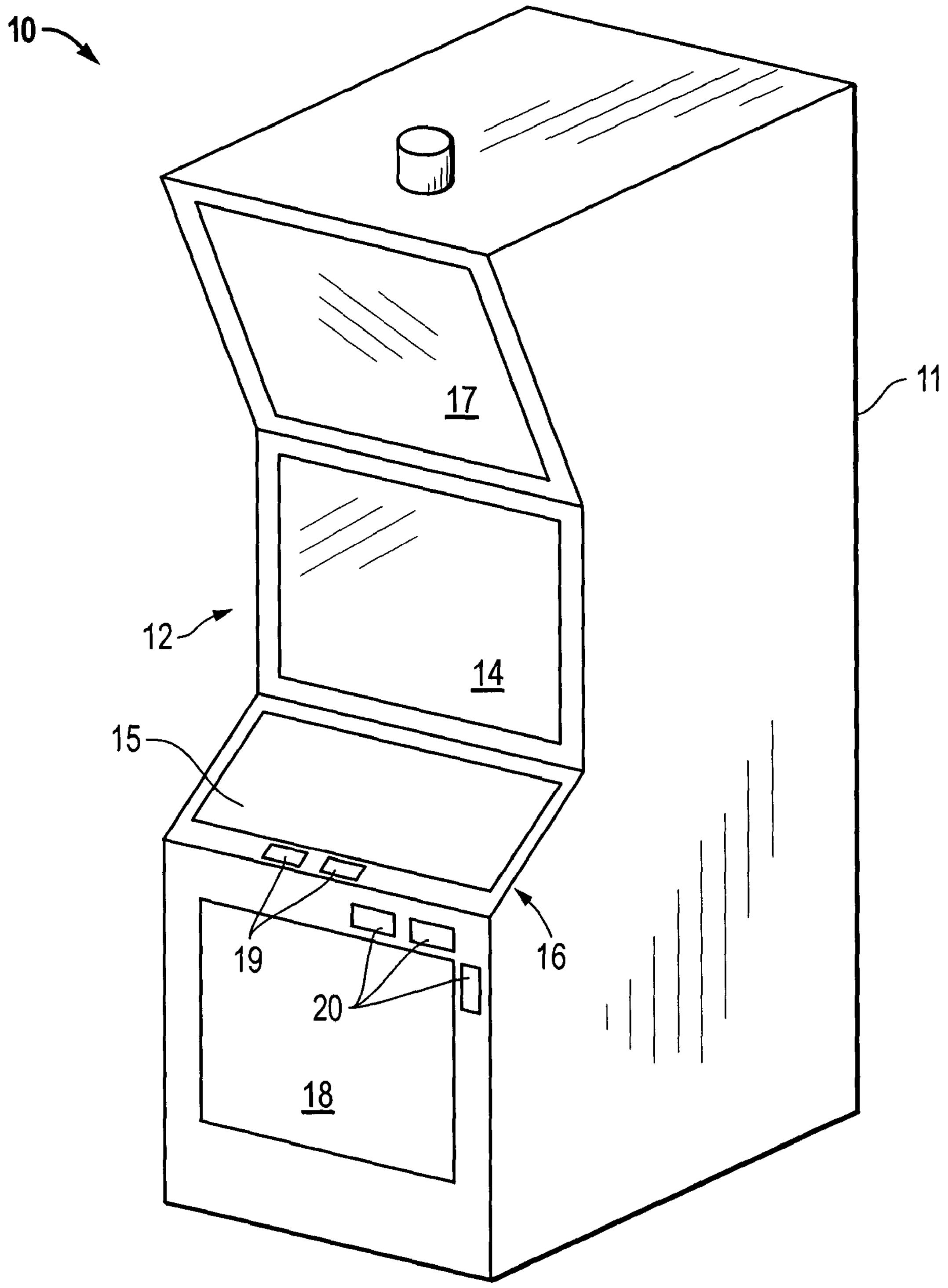
FIG. 1 is a view in perspective of a gaming machine that may be used in a gaming system embodying the principles of the invention.

Referring to FIG. 1, a gaming machine 10 includes a cabinet 11 having a front side generally shown at reference numeral 12. A game video display 14 is mounted in a central portion of the front surface 12 with a ledge 16 positioned below the game video display and projecting forwardly from the plane of the game video display. In addition to the game video display 14, the illustrated form of the invention includes a first additional video display 17 positioned on the front side of cabinet 11 above game video display 14, and a second additional video display 18 mounted on the front side of the cabinet below the game video display. Each of these displays, the game video display 14, first additional video display 17, and second additional video display 18 participate in the operation of game machine 10 to provide a presentation for a particular game or potentially presentations for multiple games simultaneously. It is noted that the gaming machine 10 is shown in an operating position in FIG. 1 and the descriptions of positions above or below certain elements are made with reference to this illustrated operating position.

Gaming machine 10 illustrated in FIG. 1, includes a player control touch screen display 15 that forms a portion of the ledge 16 extending from the plane of game video display 14. With this separate player control touch screen, the illustrated gaming machine 10 includes a total of four different video displays that together provide the game presentation or presentations in the course of operation of the gaming machine. In addition to the separate player control touch screen 15, gaming machine 10 also includes mechanical player control buttons or other input devices 19 mounted on ledge 16. Other forms of the invention may include switches, joysticks, or other player input devices mounted on ledge 16. However, all of the traditional player control inputs from devices such as switches, buttons, and pointer controls, can be provided through the illustrated touch screen display/player control device 15 and/or touch screen elements incorporated with the other displays 14, 17, and 18 included in gaming machine 10. Using the separate player control touch screen display 15 in gaming machine 10 allows the player controls to be modified readily from one game presentation to the next and even within a single presentation.

It will be appreciated that gaming machines may also include player interface devices in addition to devices that are considered player controls for use in playing a particular game. For example, gaming machines commonly include a player card reader, a voucher or ticket reader/issuer, a currency acceptor/validator, and/or coin or token acceptors/dispensers. The form of the invention shown in FIG. 1 includes these types of additional player interface devices on a lower portion of the cabinet 11 generally in the plane of the lower or second additional video display 18. These additional player interface devices 20 are located around the periphery of second additional video display 18. However, other forms of the invention may configure one or more separate displays to make up the overall display 18 with interface devices 20 or even mechanical player controls mounted within the area of the second additional video display. This use of apparent openings in the video display also applies to the player control video display 15 and other video displays on gaming machine 10.

Although FIG. 1 shows four separate video displays that combine to produce the game presentation or presentations for gaming machine 10, it will be appreciated that fewer video displays may be used. For example, a gaming machine according to the invention may include game video display 14 and only a single additional video display that may be mounted above or below the game video display and take up the entire area of the gaming machine front surface previously reserved for a static top glass or belly glass display. Also, although each video display shown in FIG. 1 is indicated as being a single display, it will be appreciated that each video display 14, 15, 17, and 18 shown in FIG. 1 may in fact be made up of two or more separate displays that combine to provide what appears to the user to be a single display. It will also be appreciated that many different types of video displays may be used for the displays in the present invention including cathode ray tubes, liquid crystal displays, plasma displays, LED displays or any other type of video display currently known or that may be developed in the future.

The invention is not limited to any particular uses of the displays 14, 15, 17, and 18 in a given presentation. For example, only one display among the several displays included in gaming machine 10 may be used in the actual conduct of a game, while the remaining displays may simply show attract graphics. In other arrangements each display may actually provide a presentation for a different game. One or more of the displays 14, 15, 17, and 18 may be used to provide other graphic content to the player unrelated to gaming, such as television programming or movies. In yet other implementations, a portion of one or more displays 14, 15, 17, or 18 may be devoted to graphics associated with one presentation while another portion of the same display may be devoted to graphics for another game presentation. For example, a gaming machine 10 may be controlled such that a right-hand side of the machine shows one game presentation while a left-hand side of the machine shows a second different game presentation. It should also be noted that one or more progressive meters may be shown on the various displays in gaming machine 10, or one or more separate progressive meters/displays may be included in gaming machine 10.

Figure 2:
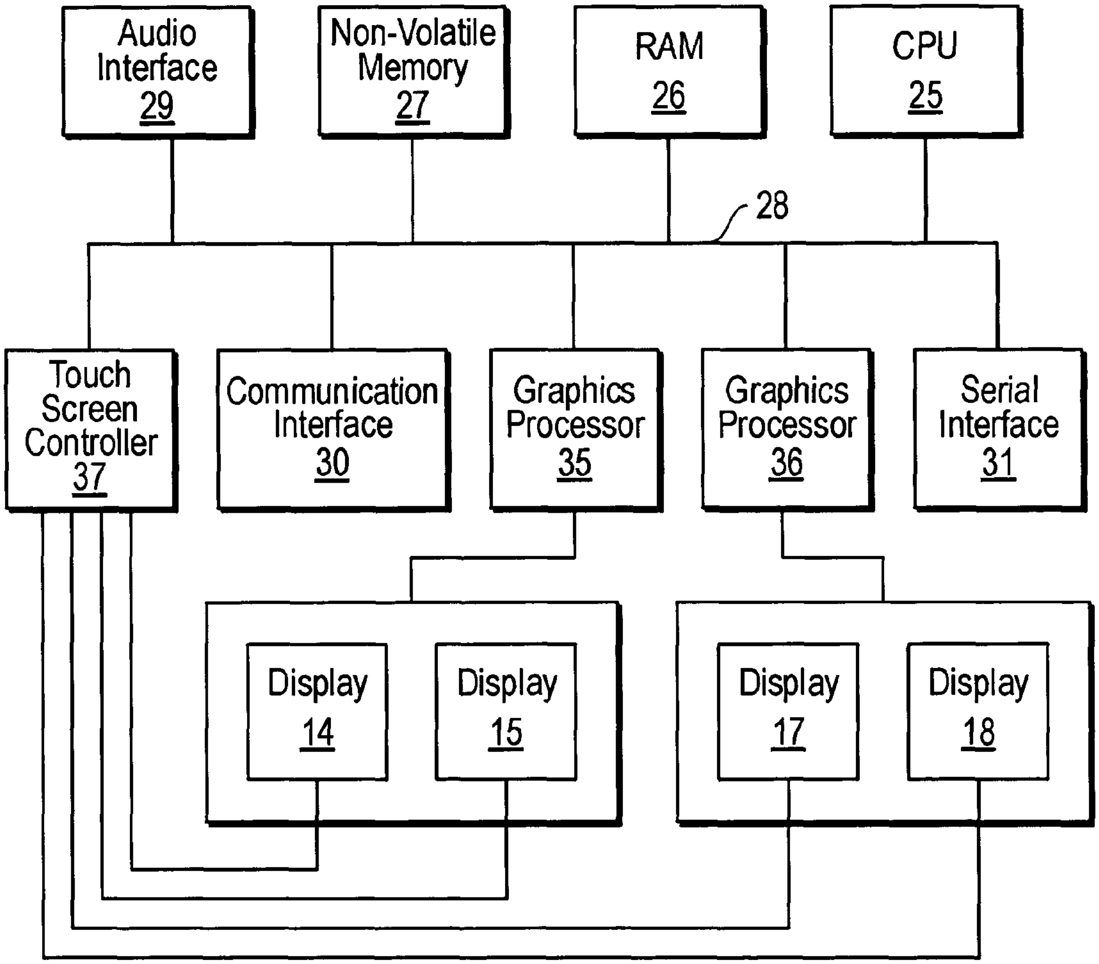
FIG. 2 is a schematic diagram showing the various components of one preferred form of gaming machine that may be used according to the present invention.

FIG. 2 provides a block diagram showing all the components of gaming machine 10 (shown in FIG. 1) including the displays 14, 15, 17, and 18. Gaming machine 10 includes a central processing unit (CPU) 25 along with random access memory 26 and nonvolatile memory or storage device 27. All of these devices are connected on a common system bus 28 with an audio interface device 29, communications interface 30, and a serial interface 31. Two graphics processors 35 and 36 are also connected on the common bus 28 and are connected to drive the displays mounted on cabinet 11 (shown in FIG. 1). Graphics processor 35 controls game video display 14 and player control display 15 while graphics processor 36 controls first additional display 17 and second additional display 18. The system shown in FIG. 2 also includes a touch screen controller 37 connected to system bus 28. Touch screen controller 37 is also connected to receive signals from touch screen elements associated with each display, 14, 15, 17, and 18. It will be appreciated that the touch screen elements themselves comprise thin films that are secured over the respective video display. These touch screen elements are not illustrated or referenced separately in the figures. It will also be appreciated that touch screen elements may not be associated with each display, although most preferred forms of gaming machines according to the present invention will have a touch screen element associated with at least game video display 14 and player control video display 15.

All of the elements 25, 26, 27, 28, 29, 30, and 31 shown in FIG. 2 are elements commonly associated with a personal computer. These elements are preferably mounted on a standard personal computer chassis and housed in a standard personal computer housing which is itself mounted in cabinet 11 shown in FIG. 1. Alternatively, the various processing elements may be mounted on one or more circuit boards mounted within cabinet 11 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed from a touch screen element secured over a video display, a system according to the invention may not include a separate touch screen controller 37. Rather, communications from the touch screen elements may be accommodated through any suitable peripheral interface such as a USB controller or a IEEE 1394 controller. Thus, the connections shown from touch screen controller 37 to the various displays may alternatively run from the displays (or more precisely the touch screen elements associated with the displays) to the serial interface 31 or any other suitable interface. Numerous other variations in the gaming machine internal structure and system may be used in accordance with the principles of the present invention.

It will also be appreciated that graphics processors are also commonly a part of modern computer systems. Although two separate graphics processors 35 and 36 are shown for controlling the four displays included in this form of the invention, it will be appreciated that a separate graphics processor may be included in the system for each particular display. It is also possible for a single graphics processor to control all of the video displays mounted on gaming machine 10. Generally, the invention is not limited to any particular arrangement of graphics processors for controlling the various gaming machine displays.

In the illustrated gaming machine 10, CPU 25 executes game software which ultimately controls the entire gaming machine 10 including the presentation provided through the video displays. CPU 25 also executes software related to communications handled through communications interface 30, and software related to various peripheral devices such as those connected to the system through audio interface 29, serial interface 31, and touch screen controller 37. CPU 25 may also execute software to perform accounting functions associated with game play. Random access memory 26 provides memory for use by the central processing unit in executing its various software programs while the nonvolatile memory or mass storage 27 provides storage for programs not in use or for other data generated or used in the course of gaming machine operation. Communications interface 30 provides an interface to other components of a gaming system that may be involved in game play. For example, some gaming machines rely on remote processing units for providing accounting functions associated with game play and also for providing game results. U.S. Pat. No. 6,524,184 provides an example of a gaming system which includes player terminals and remote systems for providing results from predetermined game play records stored at the remote systems. Even where the results of game play are determined at the gaming machine itself, gaming machines are commonly interfaced with systems for accounting purposes and control purposes, and communications interface 30 may also provide an interface for such communications. Communications interface 30 also provides an interface to a processor that controls presentation changes at the gaming machine as will be described below with reference to FIG. 3.

Audio interface 29 provides an interface for an audio system that may be included in gaming machine 10. Serial interface 31 provides an interface for serial devices such as player controls not incorporated in any touch screen display, and possibly the touch screen elements themselves, and other player interface devices such as currency acceptors/validators, a player card reader, voucher readers/printers, and coin/token drops. Serial interface 31 may also provide an interface with various meters that may be included in gaming machine 10 such as a progressive meter, for example. Commonly, a single serial interface device is used to communicate with a number of serial devices through a suitable serial protocol such as USB or IEEE 1394. However, it will be appreciated that additional serial interfaces may be used depending upon the nature of the serial protocols used for communications and the number of serial devices included in gaming machine 10.

It will be appreciated that other basic components will be included in gaming machine 10 such as a power supply, cooling systems for the various processors, audio amplifiers and speakers, and other devices that are common in gaming machines. These additional devices are omitted from the drawings so as not to obscure the present invention in unnecessary detail.

It should also be noted that the data processing required to operate the various displays and other components of gaming machine 10 may be distributed to data processing devices outside of the gaming machine itself. For example, gaming machine 10 may rely on data processing and control from a central computer system in communication with the gaming machine or various elements of the gaming machine. The example shown in FIG. 2 should be seen as merely one implementation of a configurable gaming machine, and the invention is not intended to be limited to this particular example. Rather, the invention encompasses gaming systems that include any types of gaming machines that are reconfigurable to provide different game presentations at different times.

Figure 3:
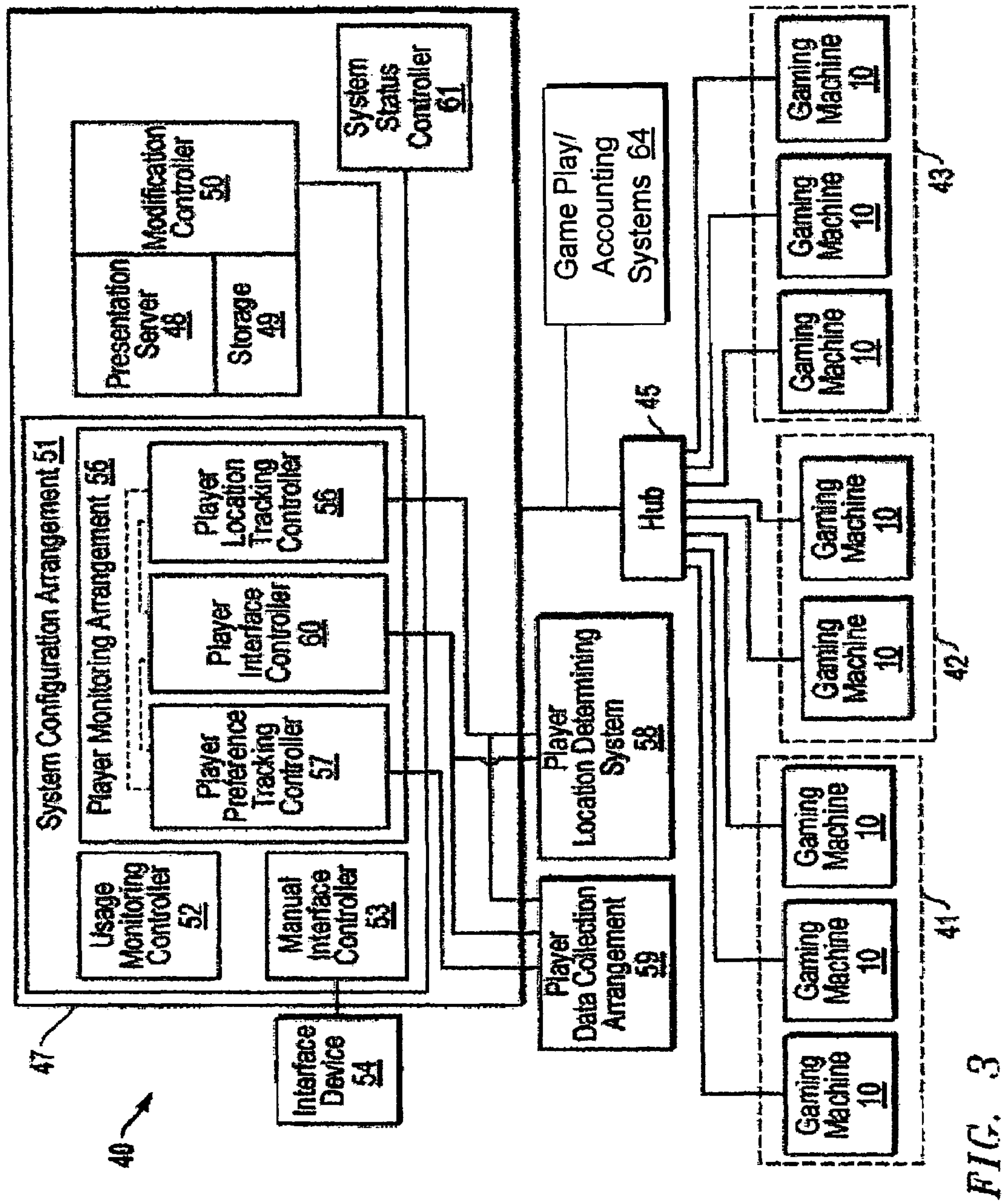
FIG. 3 is a schematic diagram showing a gaming system embodying the principles of the present invention.

Referring now to FIG. 3, a number of gaming machines 10 are included in a gaming system 40 according to the present invention. The eight gaming machines 10 shown in FIG. 3 only for purposes of example are divided into three separate groups indicated by dashed lines 41, 42, and 43. Each gaming machine 10 is shown connected to a network hub or switch 45. A separate processing device 47 is also shown connected to hub/switch 45. This separate processing device is used according to the invention to implement a presentation server 48 with associated presentation storage 49, a modification controller 50, and a system configuration arrangement 51. The illustrated system configuration arrangement 51 includes a system usage monitoring controller 52, a manual interface controller 53, and a player monitoring arrangement 55 including a player location tracking controller 56, a player preference tracking controller 57, and a player interface controller 60. Processing device 47 may comprise a single computer executing software instructions to provide the communications and functions for presentation server 48, presentation storage 49, modification controller 50, usage monitoring controller 52, and system configuration arrangement 51 described further below. The various components of system configuration arrangement 51 may rely on data or functions provided by external systems or devices. For example, manual interface controller 53 will generally require an interface device arrangement 54 such as a computer monitor and a control or input device such as a keyboard, mouse, trackball, or touch screen controls. Player preference tracking controller 57 uses a player data collection arrangement 59 in producing system configuration commands and player location tracking controller 56 preferably uses a player location determining system 58 and perhaps player data collection arrangement 59. These elements 54, 56, 57, 58 and 59 will be discussed further below with reference to the system configuration arrangement components that use those elements.

As indicated in FIG. 3, gaming system 40 may also include a separate processing system 64 for handling accounting, management, game play result determination or distribution, and other functions required in the gaming system. Although game play/accounting system 64 is shown in the figure as a separate system, it will be appreciated that the functions performed by the game play/accounting system may in fact be performed by the same processing device 47 or devices used to perform the various functions associated with system configuration arrangement 51 and modification controller 50. The present invention is not limited to any particular way of handling accounting, management, or game play determination/distribution. For example, the present invention has application to central determinant type gaming systems in which results are determined by one or more central servers outside of the gaming machines, and to gaming systems in which the individual gaming machines actually determine some or all of the results associated with the games offered through the system.

It will be appreciated by those skilled in the art of computer networks and computer system communications that the arrangement illustrated in FIG. 3 provides only a single example of a network arrangement that may be used to implement the present invention. The illustrated example would be appropriate for direct TCP/IP communications with the individual gaming machines. Other forms of the invention may use serial communications with gaming machines and may also include a suitable serial controller interposed between one or more gaming machines and hub/switch 45. Still other forms of the invention may use additional or emerging forms of interdevice communication technology to provide the necessary communications between components in the system. The present invention is generally not limited to any particular communications arrangements or protocols for providing communications between the respective gaming machines 10 and the processor 47. It will also be appreciated that the processing functions described below for components 48, 49, 50, and 51 may be distributed to different processors and are not necessarily performed by a single processor indicated at reference numeral 47. In particular, the processing functions shown in FIG. 3 as being performed by processor 47 connected in a local area network with gaming machines 10 may in fact be performed by a central computer system remote from the location of the gaming machines. On the other end of the spectrum, each gaming machine 10 may include sufficient processing capability and operational software to perform at least some functions of the modification controller 50 and system configuration arrangement 51. That is, the gaming machine 10 itself may monitor system conditions or player characteristics and switch presentations based upon the detected conditions or characteristics according to some predetermined standard, formula, or logic. For example, a gaming machine 10 according to the invention may be configured to switch presentations on its own accord in the event no player has played a game on the gaming machine for a given period of time or in the event the gaming machine is unused and the player location tracking controller 56 detects the presence of a particular player at a location near the gaming machine.

Alternatively to moving processing functions to the gaming machines 10, processing functions may be moved from the gaming machines to other elements of the system. For example, rather than executing game software at the gaming machines 10 to produce the signals required to drive the video displays and audio devices associated with a particular gaming machine, the game software may be executed remotely and the video and audio feeds routed to the gaming machine through a suitable signal feed arrangement.

The three different groups of gaming machines 10 are shown to illustrate that a gaming system according to the present invention at a given gaming facility may include different groups of gaming machines 10 with each different group including gaming machines controlled or configured to provide a particular game presentation. The number of gaming machines 10 shown in FIG. 3 is shown only for purposes of example and it will be appreciated that a gaming system 40 according to the invention may include large numbers of gaming machines all connected for communications with one or more processors used to implement presentation server 48, modification controller 50, system configuration arrangement 51, and game play/accounting systems 64 according to the invention. All of the gaming machines 10 may be located at a particular location such as a single casino. Alternatively, the gaming machines in gaming system 40 may be spread out across two or more gaming facilities. Also, because gaming machines 10 may be configured to provide any of a large number of game presentations, the gaming machines may be placed in small groups at very small gaming facilities which can still provide any of the game presentations available at large casinos. Single gaming machines 10 may also be placed directly in hotel or motel rooms and configured in any of the fashions described below to produce the game presentation or presentations desired by the guest in the respective room.

Modification controller 50 is preferably implemented through modification control program code executed by processor 47 and operates to selectively issue presentation switching instructions to the various gaming machines 10 included in gaming system 40. These presentation switching instructions are executed at the receiving gaming machine 10 to cause the gaming machine to switch from a first game presentation to a second game presentation or from a first type of attract presentation to another type of attract presentation.

Presentation server 48 and its associated storage 49 provide a repository of a number of different game presentation instruction sets and perhaps a number of attract presentation instruction sets. Each game presentation instruction set includes program code executable at a gaming machine 10 to provide a particular game presentation at the gaming machine. Each attract presentation instruction set includes program code executable at a gaming machine 10 to provide a particular attract presentation at the gaming machine. In some forms of the invention, the issuance of a presentation switching instruction from modification controller 50 is made in conjunction with a transfer of a given presentation instruction set or attract presentation instruction set from presentation server storage 49 to the particular gaming machine or machines 10 receiving the switch command. Presentation server 48 and its associated storage 49 facilitate storing a large number of different game presentations and attract presentations which may be downloaded to the various gaming machines 10 as needed. In other forms of the invention, however, each gaming machine 10 may include sufficient storage capacity (in mass storage or non-volatile memory 27 shown in FIG. 2) to store a large number of game presentation instruction sets and different attract presentation instruction sets. Storing game presentation and attract presentation instruction sets at the gaming machines reduces the need for a presentation server 48 and storage 49 respectively at a central location such as processor 47, however, a server and related storage may still be included in the system to store new game presentation software prior to downloading to the various gaming machines 10. In cases where the game presentation and attract presentation instruction sets are prestored on gaming machines 10, the presentation switching instruction from modification controller 50 simply causes the gaming machines to load and execute a particular one of the presentation instruction sets identified in the switching instruction.

Modification controller 50 issues presentation switching instructions in response to one or more system configuration commands derived or produced by the various components of system configuration arrangement 51 based upon various types of data including system condition data and player-related data. Modification controller 50 may also be configured to issue presentation switching instructions in response to a player input at one of the gaming machines 10. The various components that may be included in system configuration arrangement 51 and the information those components use to produce system configuration commands will be discussed in the following paragraphs.

The usage monitoring controller 52 shown in FIG. 3 is preferably implemented by usage monitoring program code executed by processor 47 and monitors the usage of the various gaming machines 10 included in system 40. Upon detecting certain predetermined usage conditions, monitoring controller 52 may issue a system configuration command to modification controller 50 which responds by issuing presentation switching instructions to one or more gaming machines 10. For example, where the usage information indicates that all or most of the gaming machines at a facility offering a particular game presentation are in use while gaming machines providing another game presentation are not in use, usage monitoring controller 52 may communicate a system configuration command to modification controller 50 to cause the modification controller to issue presentation switching instructions to unused gaming machines offering the less popular game presentation. These switching instructions would cause the receiving gaming machines 10 to switch to provide the more popular game presentation. Of course, the issuance of instructions to switch from one game presentation to another in a particular gaming machine may not be fully automated and may require certain operator intervention within the scope of the invention, regardless of the bases under which the switch instructions were generated.

The illustrated manual interface controller 53 is preferably implemented through manual interface program code executed by a suitable processor such as processor 47. Manual interface controller 53 communicates with interface device arrangement 54 which may comprise a display screen and suitable pointing/selection device such as a keyboard, mouse, trackball and/or touch screen control. In preferred forms of the invention, controller 53 produces a suitable graphical interface through interface device arrangement 54 which allows a system manager to produce inputs which may be interpreted by controller 53 to generate system configuration commands to be communicated to modification controller 50. For example, a system manager may know that the players in a gaming facility fit a certain profile at a certain time. The manager may know this from experience with the gaming facility or from other information (for example the arrival at the gaming facility of several tour buses full of players fitting a certain profile). Regardless of how the system manager bases his decisions, the manager may make inputs through interface device arrangement 54 to cause a certain number of gaming machines in the gaming facility to switch to provide a game presentation that will hopefully be particularly attractive to the players at the facility.

Player monitoring arrangement 55 shown in FIG. 3 includes player location tracking controller 56 and player preference tracking controller 57 which are both again preferably implemented using program code. In particular, player location tracking controller 56 is preferably implemented with player location controller program code and player preference tracking controller 57 is preferably implemented with player preference tracking controller program code.

Player location tracking controller 56 cooperates with player location determining system 58 (which may also be referred to as a player detecting arrangement) to track the physical location of various players in a gaming facility, and detect presentation switching conditions related to the physical location of various players. Player preference tracking controller 57 cooperates with player data collection arrangement 59 to monitor for conditions related to various characteristics of players using a particular gaming facility. It should be noted that player location tracking controller 56 may also use data from player data collection arrangement 59 in formulating system configuration commands. Player interface controller 60 provides for interaction with one or more players using gaming machines 10 in the system so that system configuration commands may be based not only on player characteristics but also on interactions or communications with players.

Figure 4:
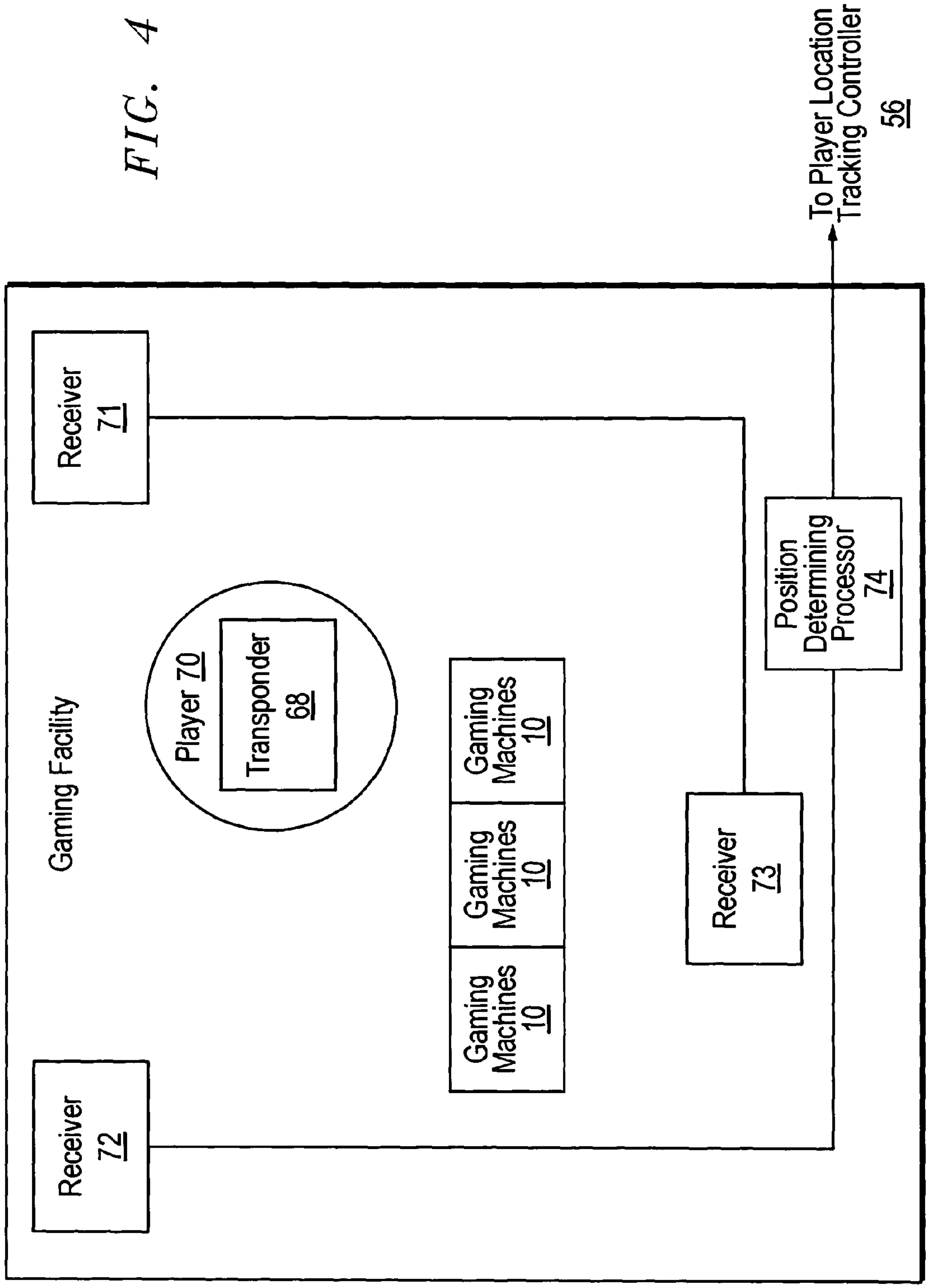
FIG. 4 is a diagrammatic representation of a player position determining system according to one form of the invention.
Figure 5:
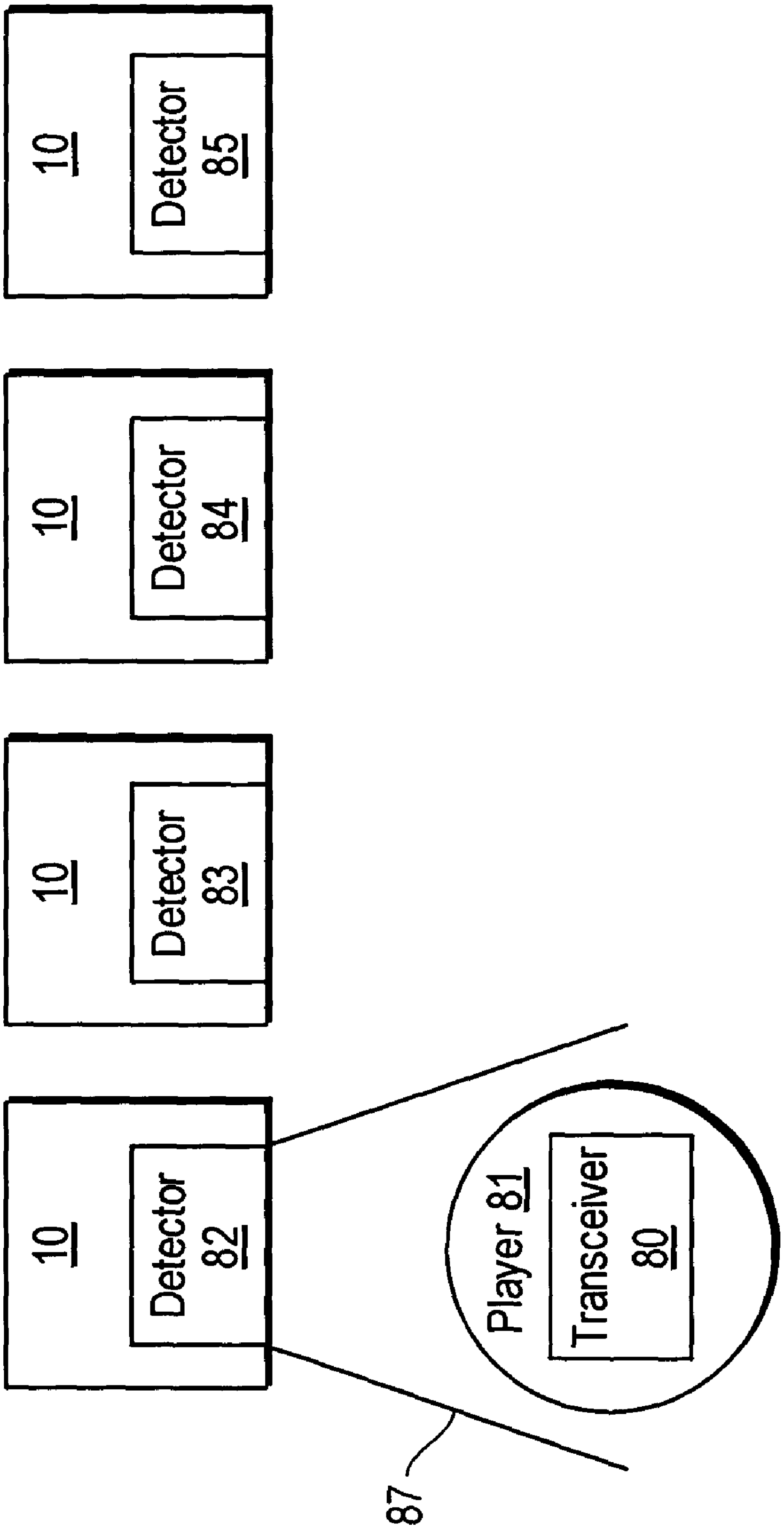
FIG. 5 is a diagrammatic representation of an alternate player position determining system according to one form of the invention.

FIGS. 4 and 5 show alternate systems that may be employed as the player location determining system 58 shown in FIG. 3 to provide player position information to player location tracking controller 56. Referring first to FIG. 4, a first alternate player position determining system relies on a radio frequency transponder 68 carried by the player 70 and preferably at least three receivers 71, 72, and 73 located at different positions around the periphery of a gaming facility in which the player's position is to be tracked. This system relies on timing variations between the receipt of the transponder signal at the various receivers 71, 12, and 73 for calculating the location of the player 70 in the gaming facility. Time variations are communicated from receivers 71, 72, and 73 to a position determining processor 74 which determines the player position according to some coordinate system. Processor 74 then communicates the player position information to player location tracking controller 56. Player location tracking controller 56 uses the player location information to determine where the player is in relation to a particular gaming machine or group of gaming machines such as the three gaming machines 10 shown in FIG. 4. For example, player location tracking controller 56 may recognize a player approaching an unused gaming machine as a presentation switching condition, and may use information about the player's preferences (from player data collection arrangement 59 directly or through player preference tracking controller 57) to cause the gaming machine to switch to the player's preferred presentation. Thus, as player 70 approaches the three unused gaming machines 10 in FIG. 4, player location tracking controller 56 may issue presentation switching instructions to the gaming machines. The graphic then displayed at the gaming machines may be a special attract presentation tailored for that player or may be for a game presentation known to the system 40 to be favored by player 70, or likely to be favored by the player based on known player preferences or play characteristics. A special attract presentation may even cause the gaming machine to call the player's name as the player approaches in an attempt to prompt the player to stop and play a game at the machine. As another example, player position information may be used by the player location tracking controller 56 to optimize a certain room in a gaming facility for the various players detected in that room. The optimization may encompass switching game presentations for the various unused gaming machines in the room or area of a gaming facility to presentations favored by the players in the room or likely to be favored by the players in the room.

FIG. 5 shows an alternate arrangement for the player location determining system 58 shown in FIG. 3. This alternate player location determining system 58 includes a transceiver 80 carried by a player 81 and a number of detectors 82, 83, 84, and 85 located at various positions throughout a gaming facility. The detectors may be associated with each gaming machine for example. Regardless of how the detectors are arranged, each detector includes a transmitter that transmits a RF signal in a certain area, such as area 87 in front of detector 82. This RF signal energizes transceiver 80 in the transmission area and causes the transceiver to emit a return RF signal containing player identifying information such as an identifier unique to the player. This return signal is picked up by a receiver associated with detector 82 and indicates that the player is located in range of that particular detector. Information from the individual detectors may be supplied to player location tracking controller 56 (shown in FIG. 3) which may act on that player location information to formulate system configuration commands for modification controller 50. Alternatively, data from the various detectors 82, 83, etc. may be combined to provide player location information to be used by player location tracking controller 56 in detecting presentation switching conditions and formulating appropriate switching signals. FIG. 5 does not show the communications lines from individual detectors 82, 83, 84, and 85, however, it will be appreciated that these devices communicate information to player location tracking controller 56 for processing directly or to some intermediate processing element before controller 56. Detectors 82, 83, etc. may be built in or otherwise associated with gaming machines 10 themselves as indicated in FIG. 5. In this arrangement, the player location tracking controller 56 may be advised when a player approaches a gaming machine 10 even before the player decides to play by logging into the machine. However, other forms of the player location tracking system 58 may include the detectors 82, 83, etc. at other locations in addition to or in lieu of locations at the gaming machines 10.

Alternatively to the player-carried transceiver, the player may carry some other device that may be read or detected when within a certain range of a suitable detecting device. For example, a player may carry an exposed badge that includes a bar code unique to the player, and the detecting device may comprise a bar code reader. As another example, the player may carry an exposed badge that is encoded with a color pattern unique to the player and the detector may be capable of reading or detecting the color pattern and distinguishing it from other color patterns assigned to other players.

Referring again to FIG. 3, player preference tracking controller 57 preferably produces system configuration commands for modification controller 50 based at least partially on actual player preferences or presumed or projected player preferences. Controller 57 may produce system configuration commands based on characteristics of a particular player known to be at a given gaming location of the system, or based upon characteristics of a group of players known or expected to be at a certain gaming location in the system at certain times. The manner in which controller 57 produces system configuration commands will normally define the sort of data that must be collected or be available through player data collection arrangement 59. The following examples illustrate the operation of player preference tracking controller 57 and the type of data that may be required from data collection arrangement 59.

In one form of the invention, player preference tracking controller 57 may use artificial intelligence techniques or any other suitable techniques to analyze player demographics and/or game presentation use patterns together with time of day information available through data collection arrangement 59 to produce system configuration commands to optimally configure a gaming facility or location according to the time of day and/or day of week and/or by month or season. For example, historical data may indicate that a first age group predominates in a given gaming facility over a certain period of the day and a second age group predominates in another period of the day. The data may also show that each different age group has a preference for a certain type or style of game presentation. In this situation, controller 57 may issue signals to modification controller 50 to switch unused gaming machines 10 from a game presentation or style of presentation favored by the first age group during the time that group predominates. Controller 57 may then cause unused gaming machines 10 to switch to a game presentation style favored by the second age group for the hours the second age group historically dominates.

Alternatively to using historical data from the data collection arrangement 59, player preference tracking controller 57 may monitor actual current player age or other characteristics to optimally configure the game presentations available through gaming machines 10 in a given gaming facility or location. This optimization or gaming machine configuration based on current player characteristics may be implemented especially in gaming facilities that require or allow player club cards or other player identification cards to gain current player information. For example, player card inputs at a gaming facility may indicate that a large number of players fitting a certain player profile are currently in the gaming facility. Player preference tracking controller 57 may use this current player information and profile information in producing system configuration commands to switch unused gaming machines to provide presentations likely to be favored by players matching the identified profile.

Another example of the use of current player information according to the invention relates to the optimization reconfigurable gaming machines 10 placed in limited access rooms such as hotel rooms. Player data collection arrangement 59 may include a database that collects check-in or room assignment information at a hotel that may be associated with a casino or independent from any casino. Player preference tracking controller 57 may use this check-in or room assignment information to identify an individual assigned to a particular room and also use historical game preference data for that individual to formulate a system configuration command for the particular gaming machine 10 in the individual's room. The command would direct presentation switching as necessary to switch the presentation provided at the gaming machine 10 to a presentation preferred by the individual.

A still further example of the operation of player preference tracking controller 57 involves monitoring for certain actions of the player and matching those actions to historical behavior. For example, a player may have a history of playing one game presentation for a certain period of time, then switching to another game presentation, and then perhaps another. In light of this historical behavior, player preference tracking controller 57 may monitor for the player to log off a gaming machine and respond to a log off by issuing a configuration command to effect a change in the game presentation to another game favored by the player.

The invention is not limited to any particular type of player data collection arrangement 59 or database structure used to collect and organize the data required by player preference tracking controller 57. Player data collection arrangement 59 may be a player card or club card system or any other type of player identifying system that assigns a unique identifier to each player and stores player demographic data and perhaps preference data at the time the identifier is assigned. These systems typically require the player to login to play any of the gaining machines and use this login information to collect additional player preference data. Alternatively to player card or player club tracking systems, player data may be collected manually by player surveys or player observation. Regardless of the manner in which the player data is collected, stored, or maintained by player data collection arrangement 59, player preference tracking controller 57 accesses this data and analyzes the data together with data on gaming facility layout and current gaming machine usage information to generate game system configuration commands for presentation switching controller 50. It is also important to note that the present system collects important data regarding player preferences and reactions to various game presentations. Thus, the system 40 in FIG. 3 may be configured to add data to player data collection arrangement 59 or some other database of player data. It is important to note that one important use of the present invention is in monitoring player reaction to new game presentations. The system may be configured to collect certain types of data after switching to a newly devised game presentation in an effort to monitor a player's reaction and perhaps obtain ideas for further presentations or ideas for changes to the monitored presentation.

Player interface controller 60 is responsible for initiating or conducting game presentation-related communications with players at various gaming machines 10 in the system shown in FIG. 3. These communications are preferably accomplished through one or more of the displays (such as displays 14, 15, 17, and 18 in FIG. 1) included in the gaming machines 10 and convey information to the player to facilitate presentation changes at the gaming machine that might interest the player. Unprompted player requests for game presentation changes at one or more gaming machines may also be routed through player interface controller 60. The following examples illustrate the operation of controller 60.

Assume that a player who has a history of playing a particular game presentation or type of presentation logs on to a gaming machine 10 in FIG. 3 providing a different presentation or type of presentation. Controller 60 may detect this by receiving player log on information from a suitable player log on system and accessing data about the player from a suitable data collection such as that stored at collection arrangement 59. This use of a game presentation new to the player may indicate that the player is feeling adventurous at that time or may be bored with their historically favorite game presentation. In any event, player interface controller 60 may, between games at the gaming machine or at other appropriate times, direct the gaming machine to provide a graphical interface that would allow the player to choose a newly created game having a presentation of the same type as the player's previous favorite or choose a different game presentation having a theme that might be of interest to the player based on the player's demographics or other characteristics. The player may also be given the choice to participate in special games that may be of interest to the player such as tournament games involving a given game presentation or presentations. Alternatively, a graphical interface may be provided at gaming machine 10 when a player logs on to a game having a presentation that has a recently updated version. This interface at the gaming machine may be used to offer the player the chance to choose that updated version without having to get up and go to a different gaming machine. In either of these examples, if the player indicates their desire to try a different game presentation through the provided graphical interface, controller 60 sends system configuration commands to presentation modification controller 50 to cause the modification controller to effect the change to the new game presentation.

Another example of the operation of player interface controller 60 arises in a situation in which a player has a history of switching game presentations after a certain period of play. In these situations player interface controller 60 may monitor the time that the player has been playing a given machine and then offer new presentations at times when the player is likely to desire a switch to a different game presentation.

Player interface controller 60 may also be used to cause a change in game presentation at more than one gaming machine 10 in FIG. 3. For example, a player having a history of playing together with a group of other players may log on to a given gaming machine 10 in FIG. 3. Controller 60 may detect this condition and may provide a graphic interface that would ask if the player desires to play in a group, how many players are in the group, and which game presentation the group wants to play. Assuming there are enough unused gaming machines adjacent to each other to accommodate the group, player interface controller 60 may respond to the player's answer by issuing system configuration commands to controller 50 to effect presentation changes at a whole block of adjacent gaming machines.

It will be appreciated from the above examples regarding the operation of player interface controller 60 that it may require data from player data collection arrangement 59, player position determining system 58 and/or a player tracking system such as a player card or club card system. FIG. 3 therefore indicates that controller 60 is connected for communications with player location determining system 58 and player data collection arrangement 59. Alternatively, to obtaining information directly from the player location determining system 58 and data collection arrangement 59, controller 60 may receive the required data indirectly through player preference tracking controller 57 and player location tracking controller 59 as indicated by the dashed lines in FIG. 3. Furthermore, the answers provided by the player through the various interfaces displayed to the player may represent important player preference information that may be directed to player data collection arrangement 59. Thus, controller 60 may direct information to the player data collection arrangement 59 as well as use data from such arrangement.

It will be appreciated that the specific system configuration arrangement 51 shown in FIG. 3 is shown only for purposes of example and that the invention is not limited to this particular arrangement. A system configuration arrangement within the scope of the present invention may include all of the illustrated components 52, 53, 55, 56, 57, and 60, or just one or more of these illustrated components. Also, the various functions performed by the illustrated components of system configuration arrangement 51 in FIG. 3 may be allocated or distributed differently between various logical components within the scope of the present invention. Again, these components are preferably implemented in software executed by a suitable data processing device.

From the above examples of the various controllers used to produce system configuration commands according to the invention, it will be noted that the various controllers may require current system status information in order to produce effective system configuration commands. Thus, the present gaming system also includes a suitable status controller 61 shown in FIG. 3 that maintains current system status information. In particular, status controller 61 maintains information on the current presentation being produced at a gaming machine 10 and whether the gaming machine is in use or idle. Status controller 61 may maintain other information such as which game presentations have recently been produced at a given gaming machine and how long a particular gaming machine has been idle or in use.

Figure 6:
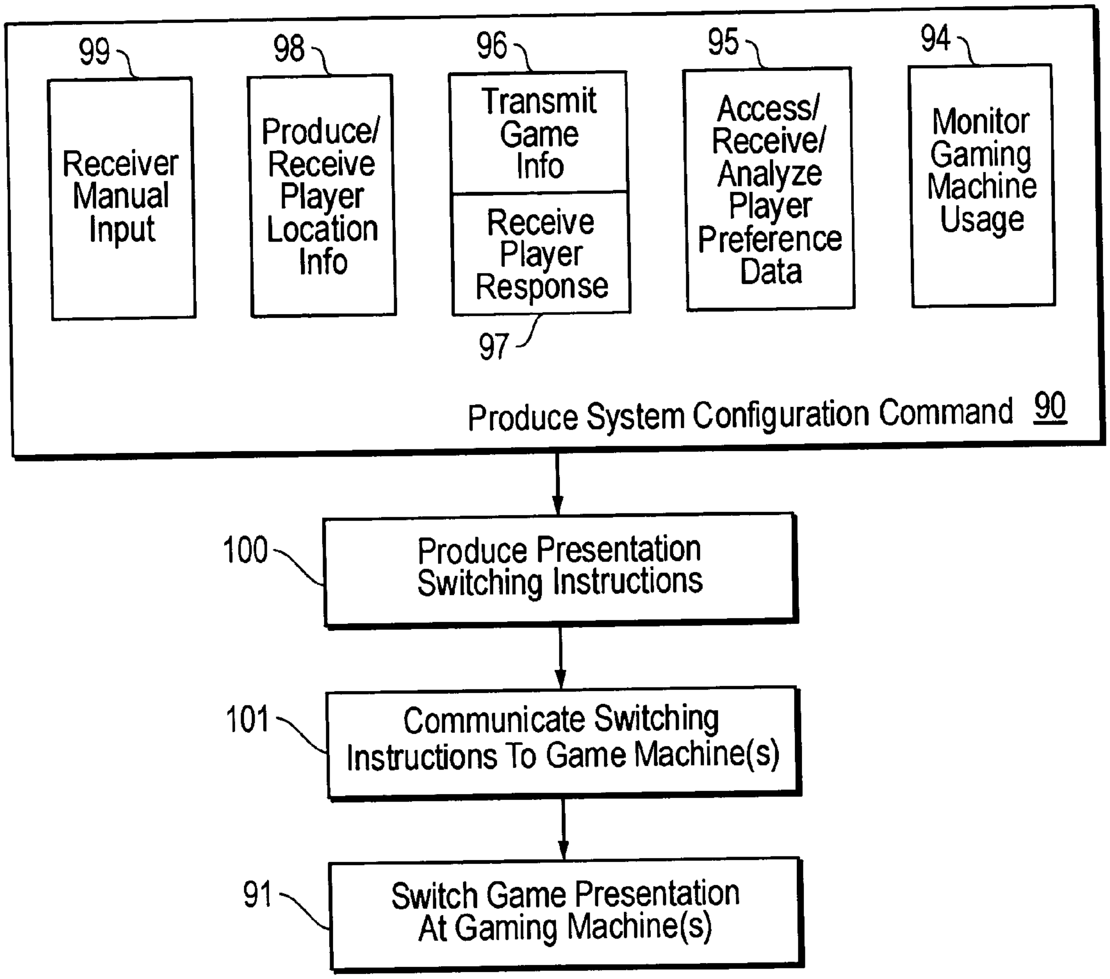
FIG. 6 is a process flow chart illustrating a method of configuring one or more gaming machines according to the present invention.

As shown in FIG. 6, a process of dynamically configuring a gaming machine includes producing a system configuration command as shown at process block 90 and ultimately switching a game presentation at one or more gaming machines as indicated at process block 91. The system configuration commands may be based at least partially on system usage as monitored by usage monitoring controller 52 (shown in FIG. 3). Thus, the process according to the invention may include monitoring gaming machine usage as indicated at process block 94. System configuration commands may also be based at least partially on player preference information as discussed above with reference to player preference tracking controller 57. Thus, the process shown in FIG. 6 includes at process block 95 the step of accessing or receiving and then analyzing player preference data using artificial intelligence and other analytical or data processing techniques. As described above with reference to player interface controller 60, system configuration commands may be based at least partially on interaction or communications with a player at one of the gaming machines in the system. Process block 96 shows the process of transmitting game information to the player while block 97 shows receiving a player response that may be used to formulate a system configuration command. Process block 98 in FIG. 6 shows the step of producing or receiving player location information for use in formulating a system configuration command. This process step is performed by player location tracking controller 56 described above. The step of producing a system configuration command may also include receiving a manual input as shown at process block 99. This manual input may be received through manual interface controller 53 as described above or through a game presentation switching request or command entered by a player at a gaming machine.

In some preferred forms of the invention the system configuration commands are not directly acted upon by the gaming machines to be configured. In these cases the system configuration commands prompt the creation of presentation switching instructions as shown at process block 100 in FIG. 6. These switching instructions are then communicated to the affected gaming machine or machines as shown at process block 101. These steps of producing presentation switching instructions in response to the system configuration commands and then communicating those instructions to the gaming machines may be performed by the modification controller 50 by itself or in conjunction with presentation server 48.

The presentation switch instruction issued at process block 101 will be directed to at least one recipient gaming machine 10 shown in FIGS. 1 through 3 using the applicable communications protocol, and may include data identifying the game presentation to be used at the gaming machine or the data or instruction set for the presentation itself. In this latter case, the data or instruction set itself may be directed from presentation server storage 49 shown in FIG. 3.

For purposes of example, assume that the gaming machines 10 in group 41 provides a game presentation A, each of the gaming machines in group 42 provides a different game presentation B, and each gaming machine 10 in group 43 provides yet a different presentation C. In this example, assume that presentation A happens to be particularly popular at one point in time and that all of the gaming machines providing that presentation, that is, all gaming machines 10 in group 41, are in use. Further assume that at least some of the machines providing the C presentation, that is, the gaming machines 10 in group 43 are not in use. It may be desirable in that situation to have more gaming machines 10 in the gaming facility to switch over to presentation A from presentation C. According to the present invention, the switch in game presentations is accomplished by communicating a presentation switching instruction from modification controller 50, and perhaps a set of game presentation instructions from server 48/storage 49, to one or more of the unused gaming machines 10 in group 43. The switching instruction will cause the receiving gaming machine 10 to switch presentations to the desired presentation. The new game presentation will include different graphics for the game video display 14 associated with the gaming machine as shown in FIGS. 1 and 2, and usually different graphics for each additional video display such as displays 15, 17, and 18 shown in FIGS. 1 and 2. In the embodiment of the invention illustrated in FIG. 3, usage monitoring controller 52 would collect the gaming machine usage information either directly from the gaming machines themselves or through some intermediary such as status controller 61, and, where that usage information meets certain switch conditions, issue signals or commands to modification controller 50 to cause it to issue the presentation switching instructions to the appropriate gaming machines.

It is apparent in this example how the additional video displays 15, 17, and 18 shown in FIGS. 1 and 2 allow switching game presentations without taking the gaming machine 10 out of service for any extended period. Furthermore, the example illustrates how the present invention enables the game presentations offered at a given gaming facility to be modified to meet demand and to optimize gaming machine usage. Of course, as described above with reference to the player preference tracking controller 57, player location tracking controller 56, manual interface controller 53, and player interface controller 60, the present invention encompasses many additional conditions either actual or presumed/projected for developing system configuration commands which ultimately cause gaming machines 10 to switch from one presentation to another.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the invention contemplates switching from one game presentation to an entirely different game presentation, the switching may be between somewhat related game presentations, or presentations having elements in common with the earlier presentation at the gaming machine. Furthermore, the invention may be implemented in a data processing environment in which more processing tasks are performed at a central processing device rather than the individual gaming machine CPUs.

The invention claimed is:

1. A gaming system including:

(a) a gaming machine including a game presentation arrangement capable of producing a respective game presentation for any one of a number of different games, the gaming machine being located in a hotel room;

(b) a player data collection arrangement for detecting that a person has been assigned to the hotel room in which the gaming machine is located and for storing player preference information for the person assigned to the hotel room;

(c) a system configuration arrangement for producing a system configuration command based on the player preference information for the person assigned to the hotel room; and (d) a game modification controller in communication with the system configuration arrangement and with the gaming machine, the game modification controller for responding to the system configuration command by communicating presentation switching instructions to the gaming machine, the presentation switching instructions causing the gaming machine to produce a game presentation specified by the presentation switching instructions.

2. The gaming system of claim 1 wherein the player data collection arrangement detects that the person has been assigned to the hotel room by receiving room check-in information.

3. A method of changing a game presentation produced by a gaming machine in a gaming facility, the method including:

(a) detecting that a player has been assigned to a hotel room in which the gaming machine is located;

(b) retrieving stored player preference information for the player;

(c) producing a system configuration command based on the retrieved player preference information for the player, the system configuration command identifying a game presentation likely to be favored by the player;

(d) communicating presentation switching instructions to the gaming machine in response to the system configuration command; and (e) changing from the game presentation at the gaining machine to the game presentation likely to be favored by the player, the change from the game presentation being performed in response to the presentation switching instructions.

4. The method of claim 3 wherein detecting that the player has been assigned to the hotel room includes receiving room check-in information.

5. A program product for configuring a gaming machine having the ability to produce a respective game presentation for a number of different games, the program product being stored on a computer readable medium and including:

(a) system configuration program code executable for retrieving game preference information on a player that has been assigned to a hotel room in which the gaming machine is located, and for producing a system configuration command identifying a second game presentation based on the retrieved game preference information on the player; and (b) presentation switching program code executable for responding to the system configuration command by communicating presentation switching instructions the gaming machine, the presentation switching instructions being effective for causing the gaming machine to switch from a first game presentation at the gaming machine to the second game presentation.

* * * * *

UNITED STATES PATENT AND TRADEMARK OFFICE

CERTIFICATE OF CORRECTION

PATENT NO. : 8,029,360 B2
APPLICATION NO. : 10/643189
DATED : October 4, 2011
INVENTOR(S) : Clifton E. Lind et al.

It is certified that error appears in the above-identified patent and that said Letters Patent is hereby corrected as shown below:

At column 13, line 20: change "receivers 71,12, and 73" to read --receivers 71, 72, and 73--.

At column 15, line 59: change "gaining machines" to read --gaming machines--.

At column 20, line 27: change "at the gaining" to read --at the gaming--.

Signed and Sealed this
Third Day of January, 2012

David J. Kappos

David J. Kappos
*Director of the United States Patent and Trademark Office*